United States Patent [19]
Schmidt, III et al.

[11] Patent Number: 5,372,118
[45] Date of Patent: Dec. 13, 1994

[54] DOUBLE BARREL SPEARGUN

[75] Inventors: John W. Schmidt, III, Palm Harbor; Morgan R. Griesinger, St. Petersburg, both of Fla.

[73] Assignee: E. Douglas Hougen, Flint, Mich.

[21] Appl. No.: 961,741

[22] Filed: Oct. 16, 1992

[51] Int. Cl.5 .............................................. F41B 7/04
[52] U.S. Cl. ........................... 124/22; 124/20.3; 124/27
[58] Field of Search ............... 124/16, 17, 20.1, 20.3, 124/21, 22, 25–27, 40, 41.1, 44.5

[56] References Cited

U.S. PATENT DOCUMENTS

| | | | |
|---|---|---|---|
| 289,283 | 11/1883 | Lewis | 124/25 |
| 1,887,337 | 11/1932 | Spotz | 124/21 X |
| 2,286,700 | 6/1942 | Vincent | 124/17 |
| 2,500,509 | 3/1950 | Bailey | 124/25 |
| 2,642,057 | 6/1953 | Watkins | 124/17 |
| 2,760,480 | 8/1956 | Carroll . | |
| 2,869,273 | 1/1959 | Thornburn . | |
| 2,888,768 | 6/1959 | Taylor . | |
| 2,997,998 | 8/1961 | Traise . | |
| 3,006,330 | 10/1961 | DeBach | 124/22 |
| 3,088,451 | 5/1963 | Crosby et al. | 124/27 |
| 3,126,880 | 3/1964 | Loe . | |
| 3,142,293 | 7/1964 | Harter . | |
| 3,340,642 | 9/1967 | Vasiljevic . | |
| 3,741,190 | 6/1973 | Lopez | 124/22 |
| 3,773,026 | 11/1973 | Romero | 123/22 |
| 3,949,731 | 4/1976 | Caso | 124/27 |
| 4,359,999 | 11/1982 | Garofalo | 124/80 |
| 4,962,747 | 10/1990 | Biller | 124/40 |

FOREIGN PATENT DOCUMENTS

| | | |
|---|---|---|
| 157206 | 6/1954 | Australia . |
| 854049 | 4/1940 | France . |
| 886437 | 11/1943 | France . |

Primary Examiner—Randolph A. Reese
Assistant Examiner—John Ricci
Attorney, Agent, or Firm—Howard & Howard

[57] ABSTRACT

A dual barrel speargun including an improved breach mechanism to prevent binding and an improved muzzle portion to increase speargun accuracy and decrease reload time. Also included is an improved safety mechanism whereby the safeties remain effective even after the triggers are partially depressed. The disclosed speargun is capable of converting from a fixed length tether to a spool type tether within seconds.

18 Claims, 6 Drawing Sheets

DOUBLE BARREL SPEARGUN

TECHNICAL FIELD

The present invention generally relates to spearguns, and more particularly relates to hand held spearguns used for fishing.

The sport of underwater spear fishing has grown rapidly in recent years due primarily to the greater availability of, and improvements in, underwater diving equipment. Spear fishing is relatively inefficient and accordingly, it is one of the most selective types of recreational fishing.

Spearguns are basically used in one of two ways. The first method of use involves tethering the spear shaft to the speargun to prevent shaft loss. Although tethering is desirable in some instances, it does limit the range of the speargun and requires the hunter to manage the tether which is easily tangled or caught on underwater structures. The tether method is commonly used when the prey is a pelagic fish (fish which roam the open sea). When pelagic fish are speared, and not killed, they swim away from the hunter and into the open sea. If the spear shaft is tethered to the spear gun (either by way of a fixed length tether or a spooling type tether), the hunter can pull the fish back and subdue it. The second method of operating a speargun involves an untethered (or free) spear shaft. When a speargun is operated in this manner, its range is only limited by the power and accuracy of the speargun propulsion mechanism. An untethered shaft eliminates the above mentioned undesirable features associated with a tether. Untethered shafts are commonly used in hunting bottom dwelling fish that live in structures or in environments where entanglements are likely. When a bottom dwelling fish is speared it typically swims to the nearest structure to "hole up". Typically, the hunter follows the fish, subdues it, and retrieves the spear shaft. Thus, it is desirable to have a spear gun which is capable of using tethered or untethered spear shafts and when using tethered spear shafts, it is further desirable to have a spear gun capable of quickly converting between fixed tether and spool tether modes of operation.

In spearguns which utilize a single spear shaft, the hunter must choose a single arrangement (either tethered or untethered spear shaft). Often times, when using a single shot spear gun, a pelagic fish will be encountered while the hunter is prepared for a bottom dweller or vice versa. In other instances, the fish may only be wounded by the first spear and could escape, or possibly injure the hunter. Additionally, many bottom dwelling fish typically stay out of the range of the spear gun. However, once a spear shot shaft is fired and misses the fish, the fish typically stop moving and watch the hunter approach. This characteristic behavior gives the hunter a clear, second shot for which he is unprepared if he is using a single shot spear gun. On other occasions, a hunter subduing a fish which has been speared may encounter a shark, attracted by the commotion caused by the injured fish. A spear gun capable of firing two shafts is the remedy for these conditions. For example, the hunter could be prepared with both a tethered line on one spear shaft and an untethered spear shaft. Double barreled spearguns are available, but are largely unpopular because they are thought to be large and unwieldly, heavy to carry, complicated to operate, and in many instances use special spear shafts that are not readily available. Some hunters have experimented with fastening two single shaft spearguns together in an attempt to provide a double shaft speargun. Although such a device is functional, it is typically difficult to maneuver underwater. Some hunters carry a single shot speargun with a spare spear attached to the gun. This allows the diver to either convert from a tethered to an untethered arrangement under water or reload after the first shot. However, the time necessary for reloading and the noise made in the process diminish the effectiveness of this technique. Thus, it is desirable to have a double barrel speargun which does not possess the drawbacks associated with currently available spearguns.

Because a hunter's time is limited under water, it is desirous to make the reloading process as efficient as possible. Most spearguns load through a hole in the muzzle. The shaft must be guided through the hole in front of the speargun and then aligned with a hole slightly larger than the shaft in the breach of the trigger mechanism. Also, if a large fish is speared from close range, before the shaft has cleared the muzzle, the spear may break the muzzle if the fish reacts violently. Thus, it is desirable to have a shaft which is detachable from the speargun muzzle even before the shaft fully clears the muzzle.

Most spearguns include a safety mechanism whereby the speargun trigger cannot release a spear shaft unless the safety mechanism is activated. Two types of safety mechanisms are commonly used. The first type of safety mechanism is activated to an on or off state and by the hunter and simply remains in the on or off state until the hunter changes the state. The second type of safety mechanism resets itself each time the speargun is loaded. With the first type of safety, if the safety is on, the speargun trigger cannot activate the spear shaft. The hunter must be prepared to quickly move the safety from the on to the off position when a shot is presented. This must be done without noise or commotion to prevent spooking the fish. In order to eliminate noise, the hunter commonly carries the gun with his finger on the trigger and the safety in the off position. If the hunter is interrupted, he may set the speargun down, loaded, trigger partially pulled, safety off. This presents a very dangerous situation. Also, because the safety mechanism is designed to remain in the on or off state, the hunter must remember to turn the safety on or off, and an error can cause a loss of a shot or an unintentional shot. The second type of safety mechanism resets itself each time the speargun is loaded. The hunter must hold it off with a button or lever before the trigger can be pulled. It is commonly known with this type of safety mechanism that when the trigger is partially pulled (but not far enough to fire the spear shaft), the safety, if released, may be beyond the catch built into the trigger and therefore will not reset itself. Under this condition, the trigger could be left partially pulled with the safety off. Thus it is desirable to have a speargun which utilizes a safety mechanism which defaults to the on position absent any interaction by the hunter. Also, it is desirable to have a safety mechanism which, even after the trigger is partially pulled, will "self-engage" in the on position if the trigger is released.

Thus, it is an object of this invention to provide a double barrel speargun which includes a muzzle adapted to allow the spear shaft to break free from the muzzle even if the shaft has not fully cleared the speargun.

It is a further object of this invention to provide a speargun having safety mechanisms which automatically reset even if the trigger has been partially engaged and then subsequently released.

Still further, it is an object of this invention to provide a speargun having a quick detached tether line whereby the tether connected between the speargun and the spear shaft can be changed between a fixed length tether and a spooling tether in a matter of seconds.

SUMMARY OF THE INVENTION

In light of the foregoing objections, the present invention provides a double barrel speargun having one of its spear shafts tethered and the other shaft untethered. The speargun of the present invention has the capability of fixing the length of the tethered spear shaft or arranging the tether to be housed on a spool reel (thereby providing a variable length tethered spear shaft). The speargun of the present invention allows the hunter to quickly convert between a fixed length tether arrangement and a spool reel tether arrangement.

Still in another aspect, the present invention provides a speargun which is easier to load due to a snap in muzzle funnel shaped breach and a propulsion band management system. The funnel shaped breach is preferably molded or cast from liquid plastic as an integral part of the barrel. When cast to the barrel, this funnel shaped breach provides an extremely rigid joint between the barrel and the breach.

Still in another aspect, the present speargun provides a muzzle and breach assembly which can be loaded from the side of the gun rather than front. A clearance slot is provided in the muzzle which is slightly wider than the spear shaft diameter. The clearance slot includes an interference slot portion which is slightly narrower than the shaft diameter. Once the spear shaft is placed into the clearance slot and pushed past the interference slot, it is positively retained in the muzzle (under the normal forces presented when using the gun). However, if abnormal forces are presented (such as piercing a fish with the spear shaft before the shaft fully clears the muzzle) the spear shaft is free to break away from the muzzle thus reducing danger to the hunter.

Still a further aspect of the speargun of the present invention provides a key shaped hole in the muzzle capable of retaining the elastic propulsion bands. The key shaped hole is comprised of two oval shaped slots, each of which are smaller than the unstretched diameter of the bands. The bands are installed by placing them into the key holes and pulling them into the key hole slots. When the band is strung to the spear shaft, it stretches to a much smaller diameter providing ample clearance in the key hole slot. When the speargun is fired the bands return to their normal, thick diameter size and are again trapped within the key hole slot. This technique provides a means for perpetually balancing the bands and therefore continually adjusting their tension. This balancing action aids in making the gun easier to load and more accurate as the propulsion force is balanced on either side of the shaft.

Other advantages and meritorious features of the present invention will become more fully understood from the following description of the preferred embodiments, the appended claims and the drawings, a brief description of which follows.

DETAILED DESCRIPTION OF THE PREFERRED EMBODIMENTS

Figure 1:
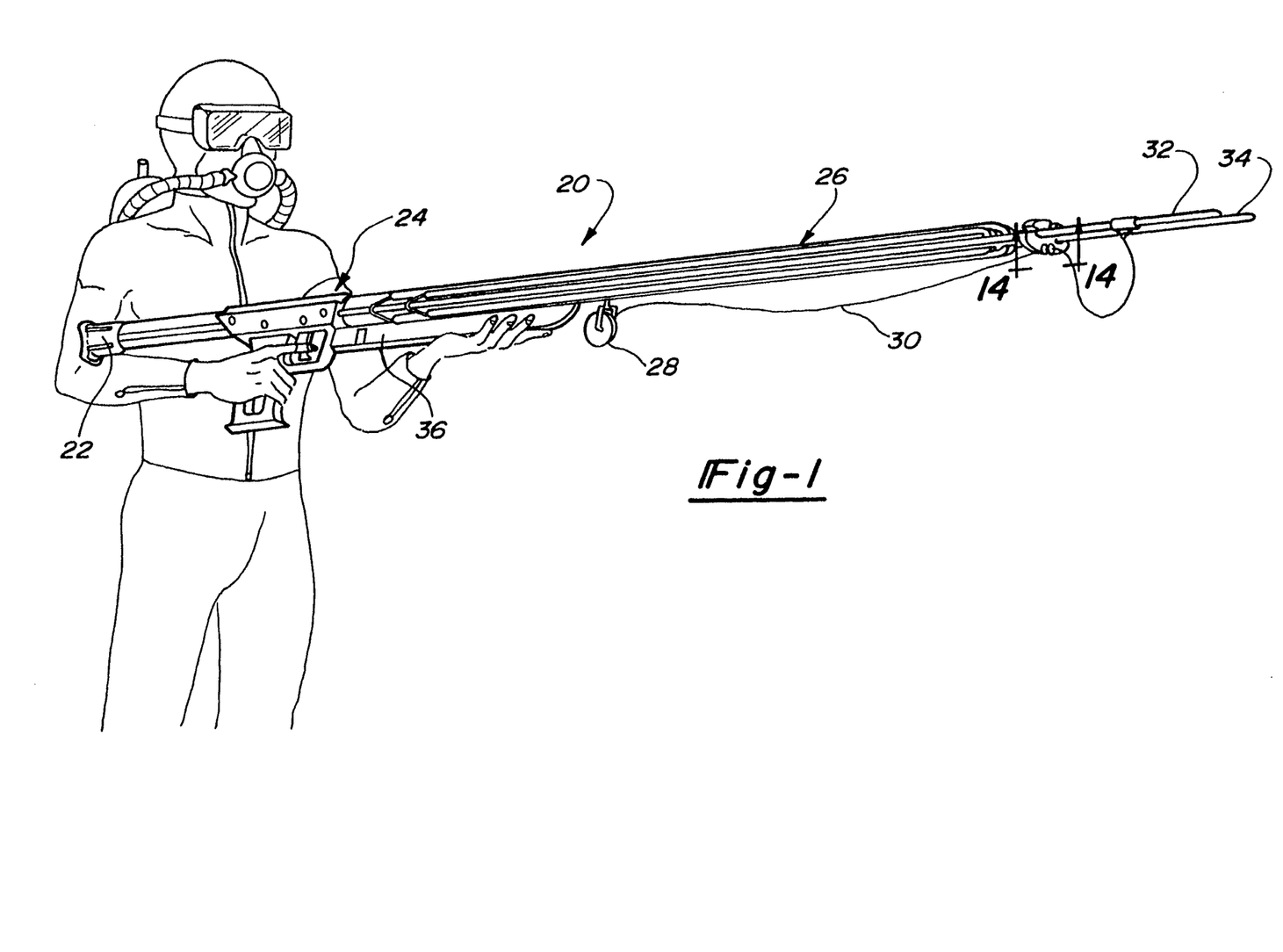
FIG. 1 is a perspective drawing of a hunter employing the double barrel speargun of the present invention.

Now referring to FIG. 1, double barrel speargun 20 includes breach assembly 24 coupled between butt plate 22 and muzzle assembly 26. Spooler 28 provides a source for storing and releasing tether 30. Spear shafts 32, 34 comprise the projectiles which are released from speargun 20.

Figures 2, 14:
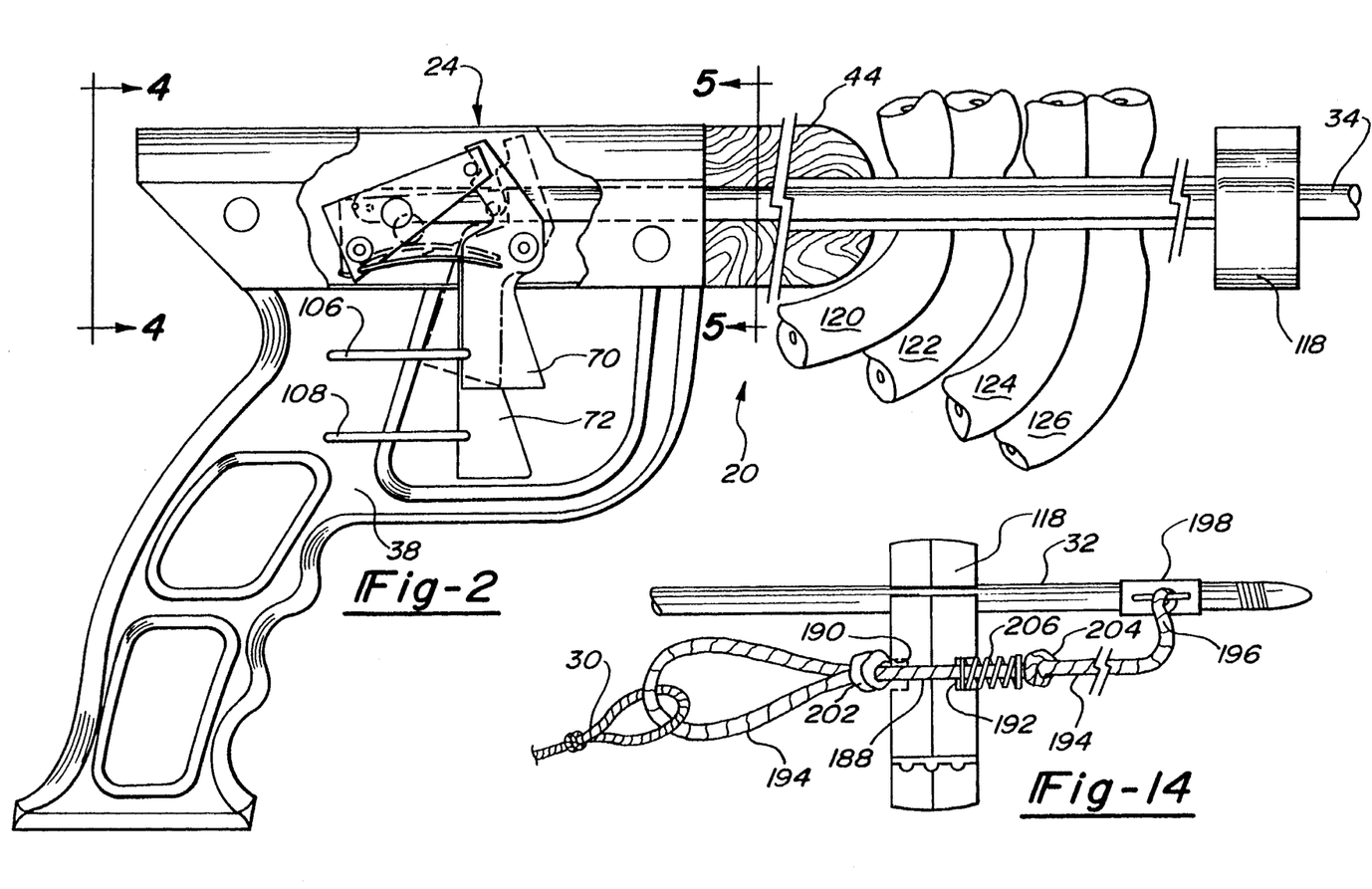
FIG. 2 is a partially cut away side view of the double barrel speargun of the present invention.
FIG. 14 is a partial bottom view of the tether quick disconnect feature of the present invention taken substantially along lines 14—14 of FIG. 1.
Figure 3:
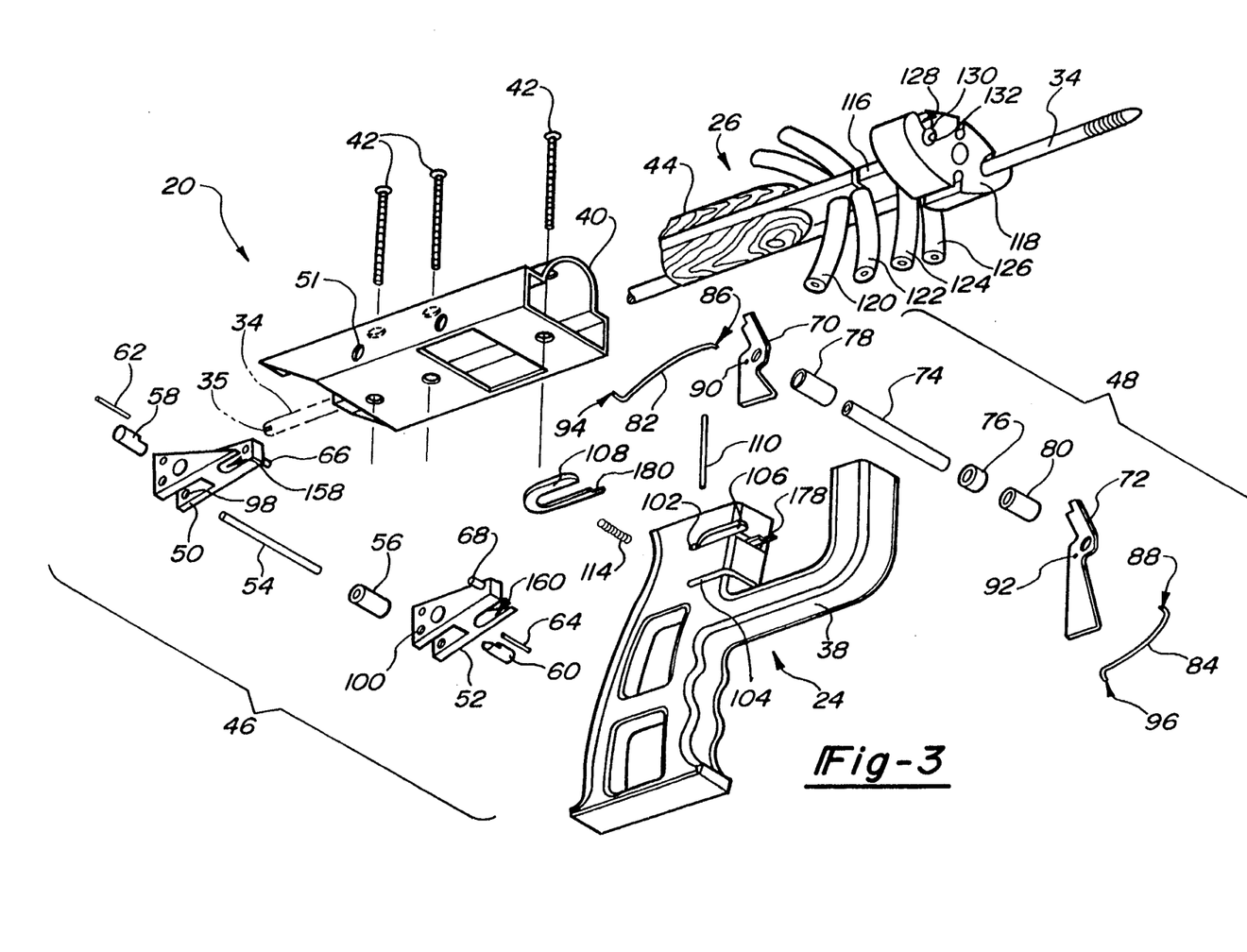
FIG. 3 is an exploded view of the double barrel speargun of the present invention.

Now referring to FIGS. 2 and 3, breach assembly 24 includes grip 38 which is mounted to breach casing 40 by way of screws 42. Barrel 44 of muzzle assembly 26 is fastened to, and extends from, the forward portion of breach casing 40. Breach casing 40 houses channel assembly 46 and trigger assembly 48. Latch assembly 46 includes right and left latches 50, 52, respectively, which are each pivotally mounted to hinge pin 54 and spaced apart from one another by spacer 56. Each latch 50, 52 includes its respectively associated catch dog 58, 60 and alignment pin 62, 64. Also, each latch 50, 52 includes a respectively associated latch pin 66, 68.

Trigger assembly 48 includes right trigger 70 and left trigger 72 which are adapted to pivot about axle 74 and are retained in a spaced part relationship by way of spacer 76. Spacers 78, 80 are adapted to fit over end portions of axle 74 and maintain their respectively associated triggers 70, 72 spaced away from the side walls of breach casing 40. Each trigger 70, 72 has a respectively associated tension spring 82, 84. Each spring 82, 84 has a respectively associated first end 86, 88 which is adapted to engage the respectively associated hole 90, 92 in its respectively associated trigger 70, 72. The second ends 94, 96 of respectively associated springs 82, 84 are adapted to engage respectively associated holes 98, 100 in each respective latch 50, 52.

Grip 38 includes slotted openings 102, 104 which house respectively associated safety catches 106, 108. Catches 106, 108 are pivotally pinned within grip 38 by way of pin 110 and maintained biased towards their respectively associated triggers 70, 72 by a respectively associated bias spring 112, 114 (bias spring 112 not shown in FIG. 3).

Barrel 44 terminates into band retainer 116. Band retainer 116 supports shaft guide block 118. Band retainer 116 is adapted to engage and retain a plurality of bands 120 through 126.

SHAFT GUIDE BLOCK

Shaft 32 is aligned with and loosely engages slot 128 (see FIG. 3) of shaft guide block 118. Block 118 is comprised of an elastic material such as rubber, urethane, nylon, etc. and is dimensionally sized to include a narrow neck portion 130. Narrow neck portion 130 blends into shaft opening 132. Slot 128 and shaft opening 132 are dimensioned to be larger than the diameter of shaft 32 while narrow neck portion 130 is dimensioned to be slightly smaller than the diameter of shaft 32. Thus, as shaft 32 is loaded into slot 128 and pressed against narrow neck portion 130, a moderate degree of force must be exerted in order to pass shaft 32 through narrow neck portion 130 and into shaft opening 132. Dimensioning of shaft guide block 118 in this way is an important aspect of the invention inasmuch as it allows shaft 32 to be loaded from the side of the gun as opposed to the front of the gun. Moreover, it allows shaft 32 to break away from the gun in a sideways fashion should a fish be speared in close proximity to the gun before shaft 32 clears shaft guide block 118. In conventional spear guns where the shaft must clear the muzzle before any lateral movement is allowed, a fish speared at close range can exert considerable lateral forces along the shaft possibly injuring the hunter. In the arrangement of the present invention, if these lateral forces are generated the shaft simply breaks out from shaft opening 132 by way of narrow neck portion 130 and slot 128.

Now referring to FIGS. 1, 3, 9, and 14, guide block 118 is fashioned from a resilient material such as rubber, urethane, nylon, etc. A typical spear shaft includes a stop dog located toward the rear of the shaft to retain sleeve 198 with the shaft when it is fired. On most spearguns, clearance is made in shaft guide block 118 to allow the stop dog to pass therethrough. However, there are problems with this approach in that the dogs rotate randomly when the shaft is fired hitting and damaging the shaft guide blocks. The shaft guide block of the present invention being comprised of resilient material allows the stop dog to pass through the guide block momentarily displacing the material which snaps back into its original shape. The guide block bore in this case may be relieved with helical grooves 208 (see FIG. 9) allowing for the shaft to be guided by "lips" which bend over as the dogs pass through further reducing resistance and improving the life of the bore and allowing for a tighter bore and improved accuracy. Therefore it is an important aspect of the present invention that the shaft guide block is comprised of a resilient material which allows the dogs to pass through with minimal resistance. Flexible grooves, flaps, or fingers can be used to achieve this.

BREACH MECHANISM

FIGS. 3, 6–8 will now be used to explain the operation of breach assembly 24. Only the operation of right trigger 70 and its related components will be explained. The operation of left trigger 72 and its related components is identical to that of right trigger 70. After shaft 32 is loaded into shaft opening 132 of shaft guide block 118, it is depressed into breach casing 40. Shaft 32 is fashioned with a slotted opening 35 to loosely engage alignment pin 62 thereby ensuring proper orientation of shaft 32 within breach assembly 24. Shaft 32 is also fashioned with notch 134 which is adapted to engage catch dog 58. As shaft 32 is moved rearwardly into breach assembly 24 and first contacts alignment pin 62, latch 50 begins to rotate 136 about hinge pin 54. This rotation eventually causes latch pin 66 to position itself upon shelf 138 (see FIG. 8) of trigger 70. As shaft 32 moves rearwardly 140, it compresses tension spring 82 thereby causing spring 82 to urge latch 50 to pivot about pin 54 in a direction opposite of rotation 136. Once pin 66 is in position to rest on shelf 138, catch dog 58 has been pivoted sufficiently upwardly to engage a side wall of notch 134. Bands 120 and 122 are stretched rearwardly until their respectively wishbone portions 142, 144 engage respectively associated notches 146, 148 of shaft 32 (see FIGS. 10 and 11). Bands 120, 122 urge shaft 32 forwardly; however, catch dog 58 prevents shaft 32 from firing because of its interfering engagement with notch 138.

Once trigger 70 is depressed, shelf 138 will pivot 154 from under latch pin 66 thereby enabling the bias of spring 82 to cause latch 50 to pivot 156 about hinge pin 54. This pivoting action drops catch dog 58 from notch 134 thereby allowing shaft 32 to be projected from speargun 20. An important aspect of the present invention is the formation of channels 158, 160 each respective latch 50, 52. Shaft 32 is placed in breach assembly 24 and bands 120, 122 engage notches 146, 148 shaft 32 is captured within channel 158. These channels are designed to closely surround (or cradle) their respective shaft. This arrangement prevents latch 50 from twisting (bowing) sideways when shaft 32 is pulled against catch dog 58 by bands 120, 122. Additional resistance against twisting is provided by passing hinge pin 54 completely through latch 50 and into breach casing 40 at two distinct pivot points 51, 53.

Figure 4:
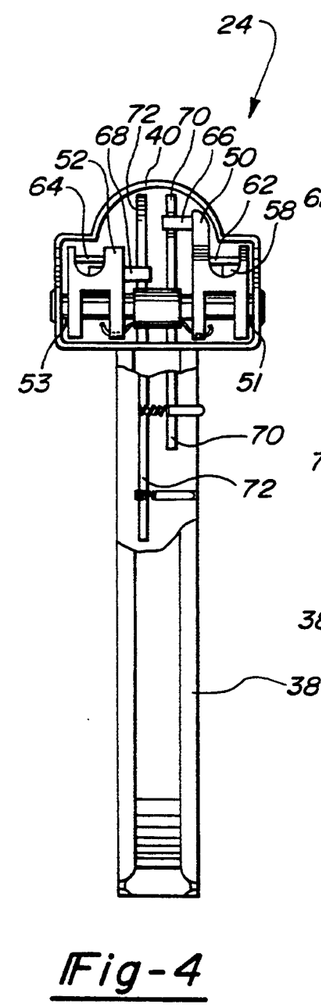
FIG. 4 is a partial cross sectional view of the breach portion of the double barrel speargun of the present invention taken substantially along lines 4—4 of FIG. 2.
Figures 5, 9:
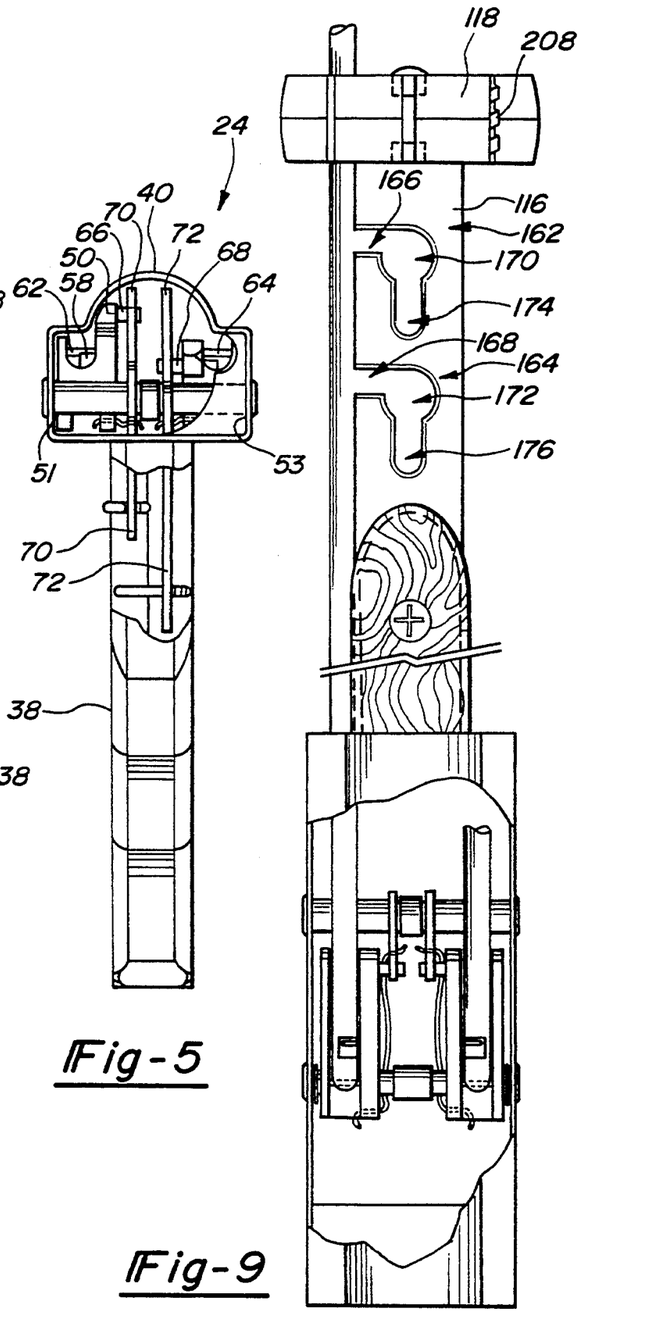
FIG. 5 is a partial cross sectional view of the breach portion of the double barrel speargun of the present invention taken substantially along lines 5—5 of FIG. 2.
FIG. 9 is a partial top view of the double barrel speargun of the present invention showing a cut away section of the breach mechanism.
Figure 6:
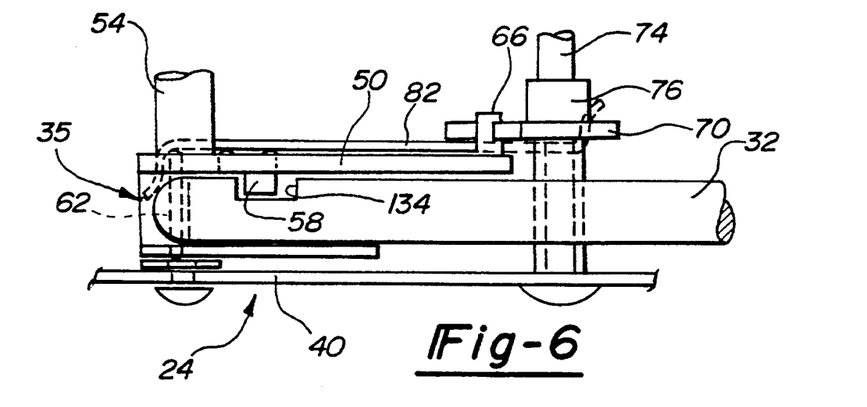
FIG. 6 is a partial diagrammatic top view of the right side portion of the breach mechanism of the double barrel speargun of the present invention depicting a spear shaft engaged in the right side breach mechanism.
Figure 7:
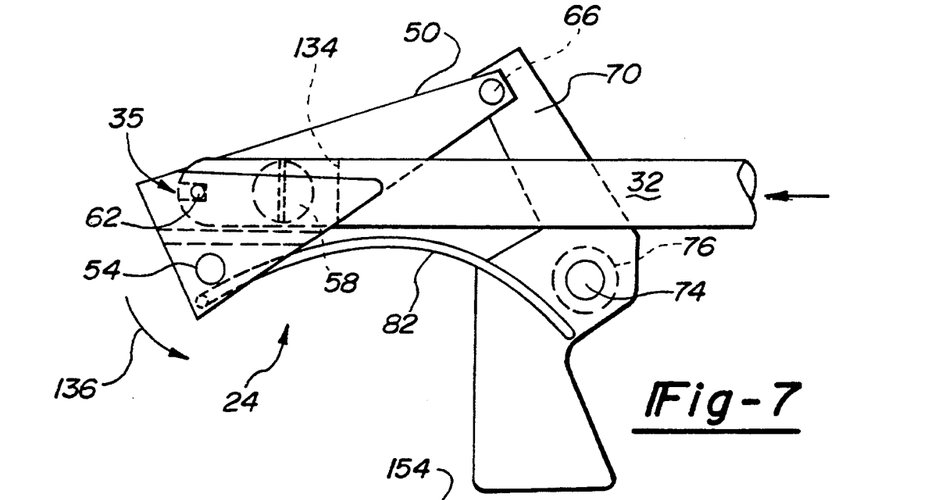
FIG. 7 is a partial diagrammatic side view of the right side portion of the breach mechanism of the double barrel speargun of the present invention depicting a spear shaft engaging the right side breach mechanism.
Figure 8:
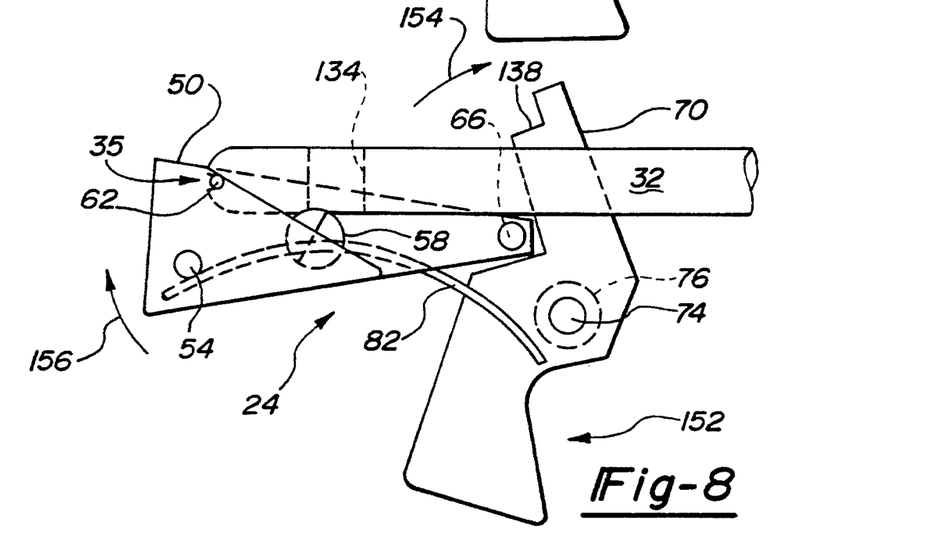
FIG. 8 is a partial diagrammatic side view of the right side portion of the breach mechanism of the double barrel speargun of the present invention depicting a spear shaft engaging the right side breach mechanism at the instant the gun is fired.

It is also important to note (as seen in FIGS. 2, 4 and 5) that trigger 72 is positioned below trigger 70 and trigger 70 is positioned in front of trigger 72. This arrangement allows the hunter to locate the triggers simply by "feel."

Now referring to FIG. 4, breach assembly 24 is shown with the right latch 50 in the non-fired position and the left latch 52 in the fired position. FIG. 5 shows the same arrangement as that of FIG. 4 except as viewed from the barrel looking into breach assembly 24.

"KEY HOLE" SHAPED BAND RETAINER

Figure 10:
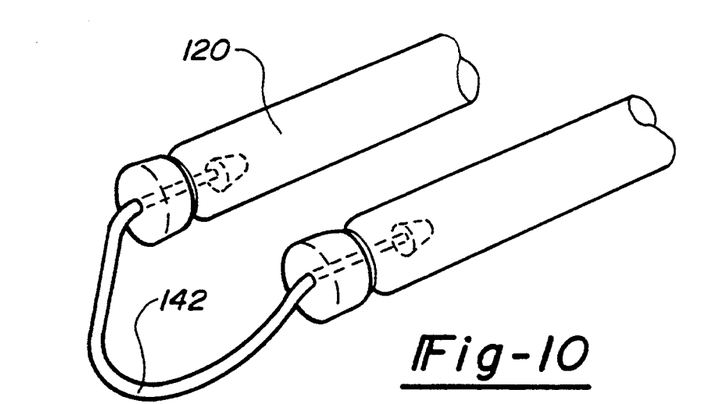
FIG. 10 is an isometric view of a wishbone engaging loop having acorn ferrules.

Now referring to FIGS. 3, 9, and 10, key hole shaped retainer 116 includes first and second key holes 162, 164. Each key hole 162, 164 is provided with a respectively associated narrow entrance opening 166, 168, a respectively associated circular opening portion 170, 172, and a respectively associated narrow slot portion 174, 176. To install closed loop bands 120, 122 within key hole 164, wishbone 142 is passed through slot 168 and bands 120, 122 are lubricated with soap. Circular opening portion 172 is smaller than the diameter of band 120 but large enough to allow the lubricated band 120 with its acorn ferrule (see FIG. 11) to be squeezed through it. Band 120 is then pulled into narrow slot portion 176 until even lengths of band 120 protrude on both sides. Band 122 is installed in circular opening portion 172 and balanced in the same manner as the first band. Band 172 remains in circular opening portion 172. Because band 120 is squeezed into narrow slot portion 176, if band 122 is engaged with shaft 32, it will not displace (or trade places with) band 120. This arrangement provides a simple means of easily installing bands while retaining them in their predetermined locations. The system provides more accurate firing and minimal band management under water.

AUTOSAFETIES

Now referring to FIG. 3, safeties that prevent accidental discharge, are incorporated into grip 38. Safety catches 106, 108 comprise a lever which is spring loaded and biased against its respectively associated trigger. Each safety catch 106, 108 includes a respectively associated ledge portion 178, 180. Springs 112, 114 (spring 112 not shown) bias respectively associated safety catches 108, 106 such that their respectively associated ledges 180, 178 prevent the rearward movement of each respectively associated trigger 70, 72. In order to activate trigger 70, the operator must depress safety catch 106 such that bias of spring 112 is overcome and ledge 178 does not interfere with the rearward movement of trigger 70. The safety of the present invention is designed such that the operator can disengage the safety and depress the trigger with a single finger. Additionally, hunters typically keep one finger on the trigger, sometimes pulling the trigger back slightly. Under this practice, band tension is on the mechanism. If the hunter then removes his finger, the trigger will not necessarily reset forward. Thus, ledges 178, 180 are designed sufficiently deep (positioned sufficiently behind their respectively associated triggers 72, 70) so that if one of the triggers is partially depressed (but the gun is not fired), ledges 178, 180 will return behind their respective trigger to a safety position. This arrangement eliminates the possibility of the operator forgetting to turn the safety back on. Additionally, even if the trigger has been partially depressed, the safety is automatically reset.

IMPROVED "WISHBONE" DESIGN

Now referring to FIGS. 10-13, wishbones 142, 182, and 184 are wire devices attached to the ends of bands 120-126. As was explained earlier, wishbones 142 are hooked onto notches 146, 148 of shaft 32. To "band a gun", a band is grasped with both hands just ahead of the wishbone and pulled back. The wishbone is manipulated onto notch 148 of shaft 32 and band 120 is then released. Second band 122 is similarly manipulated such that its wishbone engages notch 146. Commonly, wishbones are "U" shaped and bent to lie in one plane. When pulled back, the hunter must use his wrists to angle the wishbone into the notch. The wishbones set out in FIGS. 11-13 all incorporate a bend into their respective bodies which minimizes the wrist movement involved in engaging wishbone 142, 182, and 184 in notch 146.

Figure 11:
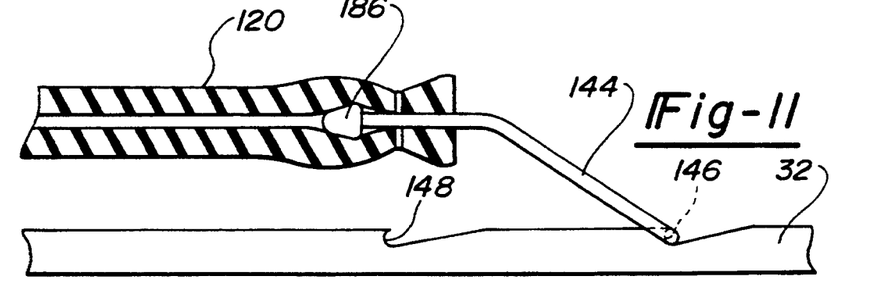
FIG. 11 is a side view of the wishbone engaging loop of FIG. 10 shown engaging a notch of a spear shaft.

Elastic bands on the spearguns generally need frequent replacement due to failure. The failure typically occurs at the point where the wishbone is attached to the band (this is the area of greatest stress). A first embodiment of a preferred wishbone is shown in FIG. 11.

Figure 12:
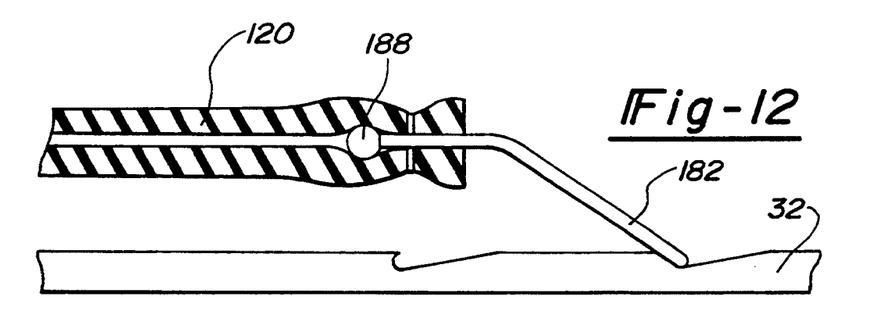
FIG. 12 is a side view of a wishbone engaging loop having ball shaped ferrules.
Figure 13:
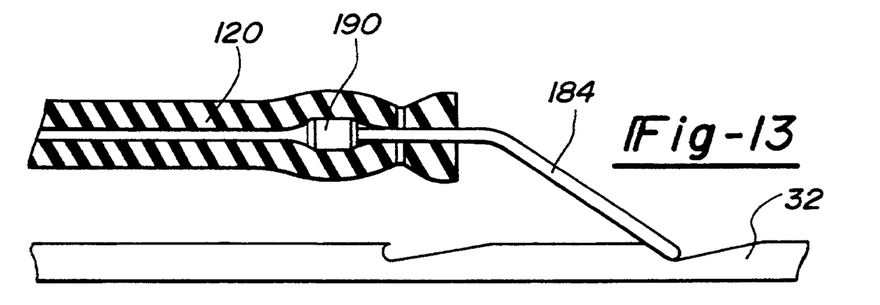
FIG. 13 is a side view of a wishbone engaging loop having barrel shaped ferrules.

This embodiment uses acorn shaped ferrule 186 which has proven to reduce failures (because it reduces stress in the vulnerable areas of the band). FIGS. 12 and 13 depict other ferrule designs which are not believed to reduce stress in the band as effectively as the acorn shaped ferrule.

QUICK LINK DETACH

Now referring to FIGS. 1 and 14, as was mentioned earlier, it is often desirable to have the versatility of operating the spear shaft with both a fixed line tether and a spool reel type tether. This versatility is built into the speargun of the present invention by virtue of the design of shaft guide block 118. Shaft guide block 118 is provided with a slot 188 which terminates into first and second counter bores 190, 192. Fixed length tether is fixed at end 196 to sleeve 198. At its other end, fixed length tether 194 is attached to tether 30 which is, in turn, stored on spooler 28. Intermediate the ends of fixed length tether 194 are first and second spaced apart knots 202, 204. Between knots 202 and 204 is disposed spring 206. Spring 206 is placed into counter bore 192, and then tether 194 is pulled so as to compress spring 206 allowing knot 202 to be placed into counter bore 190. Thus, as shown in FIG. 14, a fixed length tether arrangement is provided. If a variable length tether is desired, knot 202 is simply removed from counter bore 190 thereby allowing fixed length tether 194 to be separated from shaft guide block 118. In this arrangement, the hunter is provided with a variable length tether.

The foregoing detailed description shows that the preferred embodiments of the present invention are well suited to fulfill the objects of the invention. It is recognized that those skilled in the art may make various modifications or additions to the preferred embodiments chosen herein to illustrate the present invention, without departing from the spirit of the present invention. Accordingly, it is to be understood that the subject matter sought to be afforded protection hereby should be deemed to extend to the subject matter defined in the appended claims, including all fair equivalents thereof.

What is claimed is:

1. A spear gun comprising:
    a barrel;
    a shaft guide block attached to said barrel, wherein said shaft guide block includes a longitudinal passage therethrough and a transverse passage, said longitudinal passage adapted to guide the path of a spear shaft upon discharge from said spear gun and wherein said transverse passage intersects said longitudinal passage and terminates at an outer surface of said shaft guide block, whereby said transverse passage allows said spear shaft to be placed in said longitudinal passage by passing said spear shaft through said transverse passage;
    a breach assembly having an opening therein adapted to accept a spear shaft;
    a latch mounted within said breach assembly;
    a band retainer mounted to said barrel and a band connected to said retainer;
    means for interconnecting said band to said spear shaft;
    a safety catch mounted to said breach assembly and interconnected to said latch to prevent said latch from moving until said safety catch is released.

2. The speargun of claim 1, wherein said shaft guide is fabricated from a resilient material.

3. The speargun of claim 2, wherein said shaft guide is fabricated from rubber.

4. The speargun of claim 3, wherein said transverse passage includes a neck portion bounded between said longitudinal passage and said outer surface of said shaft guide block.

5. The speargun of claim 2, wherein said shaft guide is fabricated from urethane.

6. The speargun of claim 2, wherein said shaft guide is fabricated from nylon.

7. The spear gun of claim 1, wherein said latch is pivotally mounted for pivoting between first and second positions and includes a channel portion adapted to closely receive opposite sides of said spear shaft.

8. The spear gun of claim 1, wherein said safety catch is pivotally mounted about a second axis, said safety catch including first and second portions, said first portion being adapted for engagement by a user, said second portion including means for restricting the movement of said trigger, said restricting means including a notch in said second portion of said safety catch, dimension sufficiently deep so as to allow said trigger to move rearwardly while still preventing said spear gun from firing.

9. The spear gun of claim 1, wherein said means for interconnecting said band and to said spear shaft includes a wire having first and second ferruled ends and an intermediate body portion, said intermediate body portion comprising first and second sections, with said first and second sections generally lying in different planes.

10. The spear gun of claim 1, wherein said band retainer includes a generally L-shaped slot in said barrel, said L-shaped slot having first and second portions, said first portion extending laterally with respect to said barrel and opening outwardly, said second portion extending longitudinally of said barrel and communicating with said first portion, said first portion being adapted to receive at least two bands with said bands being secured in said second portion.

11. The speargun of claim 1, further including a tether and a tether mount block attached to said speargun, said tether mount block including a slot therethrough terminating in first and second counterbores, said first counterbore adapted to engage and retain a knot placed in said tether thereby fixing said tether to said speargun;

biasing means adapted to encircle said tether and engage said second counterbore, whereby said biasing means urges said knot in said tether into said first counterbore, thereby ensuring positive engagement between said tether and said speargun.

12. The speargun of claim 1, wherein said speargun includes a band retainer mounted to said barrel, said band retainer including first and second openings therethrough, intermediate lateral extremities of said band retainer, which extend generally longitudinally with respect to said speargun, and opening through top and bottom surfaces of said band retainer, said first and second openings being in communication;

and a third opening communicating with said first opening, said third opening connecting said first opening to a said lateral extremity of said band retainer, with the said third opening being adapted to initially receive a band and direct said band into said first opening.

13. The speargun of claim 12, wherein said first and second openings are adapted to simultaneously retain a pair of bands, said bands being adapted to be inserted into said third opening for mounting within said first and second openings.

14. A speargun of the type including elastic bands for propelling a spear shaft, said speargun comprising:

a barrel;

a band retainer mounted to said barrel, said band retainer including first and second openings therethrough, intermediate lateral extremities of said band retainer, extending generally longitudinally with respect to said speargun, and opening through top and bottom surfaces of said band retainer, said first and second openings being in communication with one another with said second opening being smaller than said first opening; and a third opening communicating with said first opening, said third opening connecting said first opening to a said lateral extremity of said band retainer, said third opening being adapted to initially receive a band and direct said band into said first and second openings; and said first and second openings being adapted to simultaneously retain a pair of bands.

15. The speargun of claim 14, wherein said speargun includes a pair of band retainers each adapted to mount a pair of bands.

16. The speargun of claim 15, wherein said speargun includes a pair of spear shafts, with each spear shaft being adapted to receive one pair of said two pair of bands.

17. The speargun of claim 15, wherein said pair of band retainers are longitudinally spaced along the speargun.

18. The speargun of claim 14, wherein said speargun includes a shaft guide block attached to said barrel, said shaft guide block including a longitudinal passage therethrough and a transverse passage, said longitudinal passage being adapted to guide the path of a spear shaft upon discharge from said speargun, said transverse passage intersecting said longitudinal passage and terminating in an outer surface of said shaft guide block, said transverse passage allowing said spear shaft to be placed in said longitudinal passage by passing said spear shaft through said transverse passage.

* * * * *